US008275743B1

(12) United States Patent
Dantkale (10) Patent No.: US 8,275,743 B1
(45) Date of Patent: Sep. 25, 2012

(54) METHOD AND APPARATUS FOR SECURING DATA VOLUMES TO A REMOTE COMPUTER USING JOURNAL VOLUMES

(75) Inventor: Suhas Ashok Dantkale, Solapur (IN)

(73) Assignee: Symantec Corporation, Mountain View, CA (US)

( * ) Notice: Subject to any disclaimer, the term of this patent is extended or adjusted under 35 U.S.C. 154(b) by 307 days.

(21) Appl. No.: 12/538,566

(22) Filed: Aug. 10, 2009

(51) Int. Cl.
*G06F 17/00* (2006.01)
(52) U.S. Cl. .................... 707/619; 707/610; 711/162
(58) Field of Classification Search .................. 707/200, 707/204, E17.01, E17.044; 711/162, E12.001, 711/E12.103
See application file for complete search history.

(56) References Cited

U.S. PATENT DOCUMENTS

| 2005/0050115 | A1  | 3/2005 | Kekre |
| 2008/0168303 | A1  | 7/2008 | Spear et al. |
| 2009/0113149 | A1* | 4/2009 | Kondo et al. ............ 711/161 |
| 2011/0153930 | A1* | 6/2011 | Serizawa et al. ......... 711/114 |

* cited by examiner

*Primary Examiner* — Neveen Abel Jalil
*Assistant Examiner* — Jagdish Pandya
(74) *Attorney, Agent, or Firm* — Campbell Stephenson LLP (57) ABSTRACT

A method and apparatus for securing data volumes to a remote computer using journal volumes is provided. In one embodiment, a method for securing data volumes in memory to a remote computer using at least one processor includes accessing at least one data volume and at least one journal volume, replicating the at least one journal volume after each operation of a plurality of file system operations associated with the at least one data volume and creating at least one data volume copy at a remote computer using the at least one replicated journal volume.

18 Claims, 6 Drawing Sheets

METHOD AND APPARATUS FOR SECURING DATA VOLUMES TO A REMOTE COMPUTER USING JOURNAL VOLUMES

BACKGROUND OF THE INVENTION

1. Field of the Invention

Embodiments of the present invention generally relate to a data protection systems and, more particularly, to a method and apparatus for securing data volumes to a remote computer using journal volumes.

2. Description of the Related Art

Various organizations (e.g., small to large enterprises) accumulate large amounts of mission critical data. Within a typical computing environment, these organizations may employ a number of technologies to process, store, protect, recover, produce and secure mission critical data. These organizations may configure a plurality of computers with various software programs and hardware devices in order to operate effectively. For example, a computer may utilize an operating system and one or more related components to produce a platform through which several software applications (e.g., word processing software, email software, spreadsheet software and/or the like) cooperate with certain hardware devices, such as hard disk space, memory, network components, storage components and/or the like. Moreover, the typical computing environment may include one or more data storage systems for facilitating permanent storage, retrieval and transmission of the mission critical data throughout a computer network.

As an example, an organization may employ one or more data protection systems to backup and recover the mission critical data after a disaster or data corruption. Such data protection systems may continuously create and update copies of the mission critical data across a primary node and a backup node (e.g., a bunker) in order to prevent data loss and facilitate data recovery. Hence, the mission critical data is stored within one or more data volumes at the backup node. Some data protection systems also maintain real-time copies of the mission critical data at a remote node (e.g., a remote computer).

The synchronous replication of the data volumes between the primary node and the backup node consumes a significant amount of computer resources and technician time. In order to storing the mission critical data at the backup node, a system administrator must configure a considerable amount of storage space. Furthermore, the system administrator must configure additional storage for one or more journal volumes (e.g., Storage Replicator Log volumes) that indicate one or more file system operations associated with the data volumes. If a disaster destroys the primary node as well as the backup node, the system administrator must restore the mission critical data from the remote node.

Therefore, there is a need in the art for a method and apparatus for securing data volumes to the remote node using journal volumes without replicating the data volumes to the backup node.

SUMMARY OF THE INVENTION

Embodiments of the present invention generally include a method and apparatus for securing data volumes to a remote computer using journal volumes. In one embodiment, a method for securing data volumes in memory to a remote computer using one or more processors includes accessing at least one data volume and at least one journal volume, replicating the at least one journal volume after each operation of a plurality of file system operations associated with the at least one data volume and creating at least one data volume copy at a remote computer using the at least one replicated journal volume.

In some embodiments, the at least one data volume may be synchronously replicated to the remote computer after a predefined time period. In some embodiments, a plurality of write data operations may be executed onto the at least one data volume copy. In some embodiments, the plurality of file system operations may be periodically replicated onto the at least one data volume copy. In some embodiments, the synchronous replicating step may be paused to perform the creating step. In some embodiments, the at least one journal volume may be synchronously replicated to the backup computer and at least one write data operation may be asynchronously replicated to the at least one data volume copy in parallel. In some embodiments, the replicating step and the creating step may be performed simultaneously while permitting simultaneous read/write access to the at least one replicated journal volume at the backup computer. In some embodiments, access to at least one volume plex associated with the at least one journal volume may be coordinated. In some embodiments, the at least one data volume and the at least one replicated journal volume at the backup computer may be transformed into the at least one data volume copy at the remote computer.

In another embodiment, a computer-readable-storage medium comprising one or more processor-executable instructions that, when executed by at least one processor, causes the at least one processor to store, in at least one journal volume, information associated with a plurality of file system operations to at least one data volume, update at least one journal volume copy that is located at a backup computer after each operation of the plurality of file system operations associated with the at least one data volume and replicate the at least one data volume to a remote computer using the at least one journal volume copy.

In some embodiments, the one or more processor-executable instructions may synchronously replicate the at least one journal volume to the remote computer. In some embodiments, the one or more processor-executable instructions may coordinate access to at least one volume plex associated with the at least one journal volume. In some embodiments, the one or more processor-executable instructions may synchronously replicate the at least one journal volume to the backup computer and asynchronous replicate at least one write data operation to at least one data volume copy in parallel. In some embodiments, the one or more processor-executable instructions may play the plurality of write data operations onto the at least one copy of the at least one data volume.

In some embodiments, the one or more processor-executable instructions may transform the at least one data volume and the at least one replicated journal volume at the backup computer into the at least one data volume copy at the remote computer. In some embodiments, the one or more processor-executable instructions may update the at least one journal volume copy and replicate the at least one data volume using the at least one journal volume copy while permitting simultaneous read/write access to the at least one journal volume copy at the backup computer.

In yet another embodiment, a system for securing data volumes to a remote computer comprising one or more processors, and memory storing instructions executable on the one or more processors to access at least one data volume and at least one journal volume, synchronously replicate the at least one journal volume after each operation of a plurality of file system operations associated with the at least one data volume and create at least one data volume copy at a remote computer using the at least one replicated journal volume.

In some embodiments, the system may further include one or more instructions to perform the synchronously replication of the at least one journal volume and updating the at least one data volume copy while permitting simultaneous read/write access to the at least one replicated journal volume at the backup computer. In some embodiments, the system may further include one or more instructions to coordinate access to at least one volume plex associated with the at least one journal volume. In some embodiments, the system may further include one or more instructions to simultaneously update the at least one replicated journal volume after each write data operation of at least one write data operation and asynchronously replicate the at least one write data operation to the at least one data volume copy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure facilitate data volume recovery by replicating one or more data volumes to a remote computer using one or more journal volumes. In some embodiments, a creation module (e.g., a creation module 116 of FIG. 1) replicates the one or more data volumes using the one or more journal volume copies at a backup computer. In some embodiments, the creation module may be configured to create one or more data volume copies at the remote computer and then, play one or more file system operations after a pre-determined time period. Accordingly, the one or more data volume copies are not maintained at the backup computer.

Figure 1:
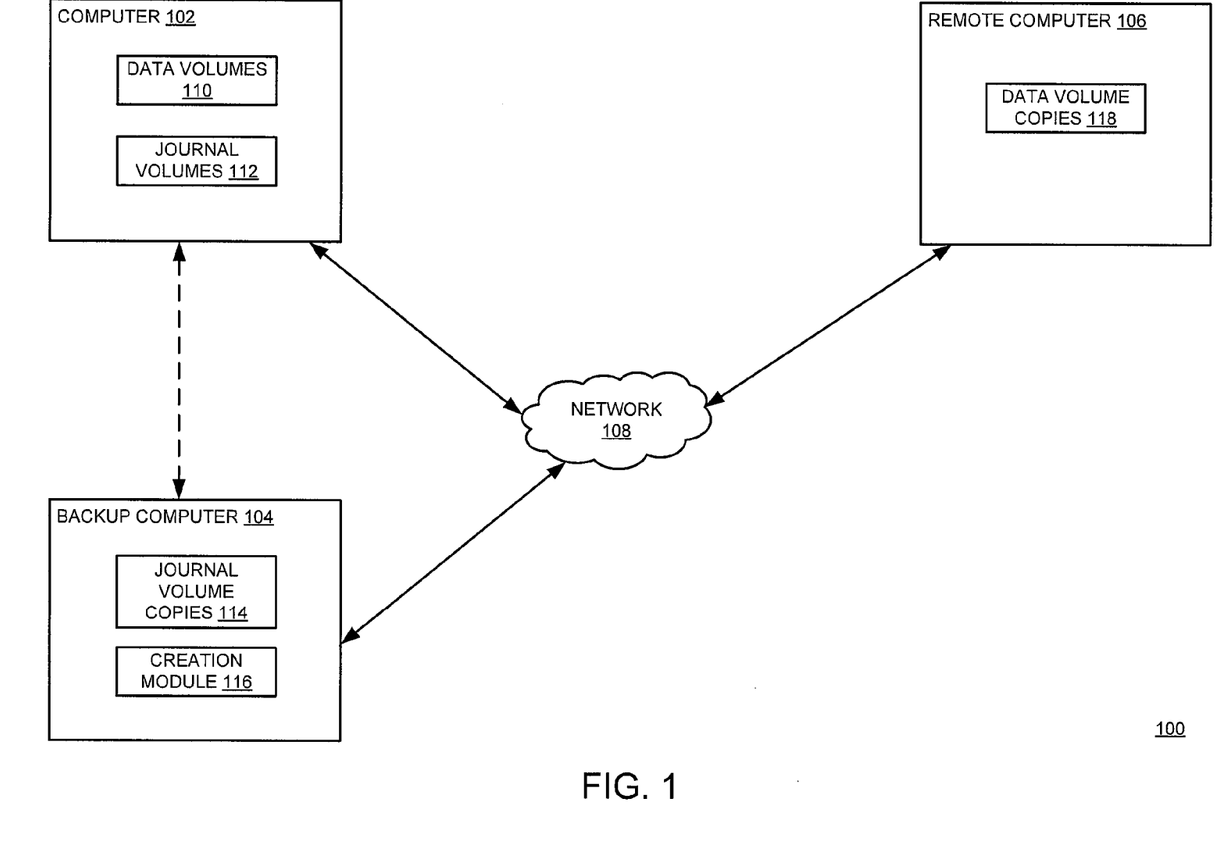
FIG. 1 is a block diagram of a system for securing data volume to a remote computer according to various embodiments.

FIG. 1 is a block diagram of a system 100 for securing data volumes at a remote computer using journal volumes according to various embodiments. The system 100 may include a computer 102, a backup computer 104 and a remote computer 106 where each component is coupled to each other through a network 108.

The computer 102 may be a type of computing device (e.g., a laptop, a desktop, a Personal Digital Assistant (PDA) and/or the like) known to one of ordinary skill in the art having the benefit of this disclosure. The computer 102 may include one or more data volumes 110 as well as one or more journal volumes 112. The data volumes 110 may include a plurality of files that organized in accordance with a file system (e.g., File Allocation Table (FAT)). The journal volumes 112 (e.g., Storage Replicator Log (SRL) volumes) may include one or more circular buffers that indicates one or more write data operations associated with the data volumes 110 over a particular time period.

The backup computer 104 may be a type of computing device (e.g., a bunker node or replicator computer system) known to one of ordinary skill in the art having the benefit of this disclosure. The backup computer 104 may be supported by various data backup and recovery software programs. In some embodiments, the backup computer 104 may include one or more journal volume copies 114 and various software packages, such as a creation module 116 as explained further below.

Similarly, the remote computer 106 may be a type of computing device (e.g., a laptop, a desktop, a Personal Digital Assistant (PDA) and/or the like) known to one of ordinary skill in the art having the benefit of this disclosure. The remote computer 106 may be located at a site that is different from the backup computer 104 and/or the computer 102. In some embodiments, the remote computer 106 may include one or more data volume copies 118 as explained further below.

The network 108 comprises a communication system that connects computers by wire, cable, fiber optic, and/or wireless links facilitated by various types of well-known network elements, such as hubs, switches, routers, and the like. For example, the network 108 may be part of a Local Area Network (LAN) (e.g., the Internet or intranet) using various communications infrastructure, such as Ethernet, WiFi, WiMax, General Packet Radio Service (GPRS), and the like. The network 108 may form a portion of a Storage Network Area (SAN) using various communications infrastructure, such as Ethernet, Fibre Channel, InfiniBand, Internet Small Computer System Interface (iSCSI) and/or the like. As an example, such a Storage Area Network (SAN) may include Fibre Channel switches and/or ISCSI block storage devices.

Figure 2:
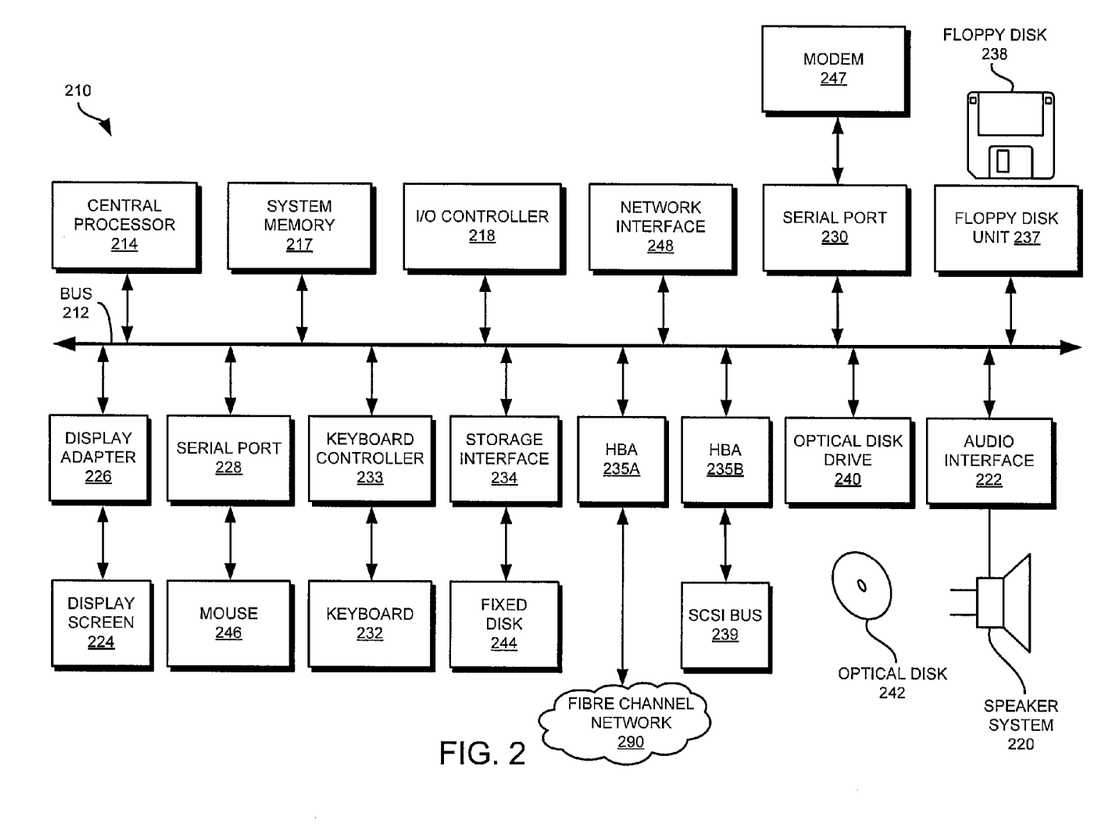
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 102, the backup computer 104 and/or the recovery computer 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
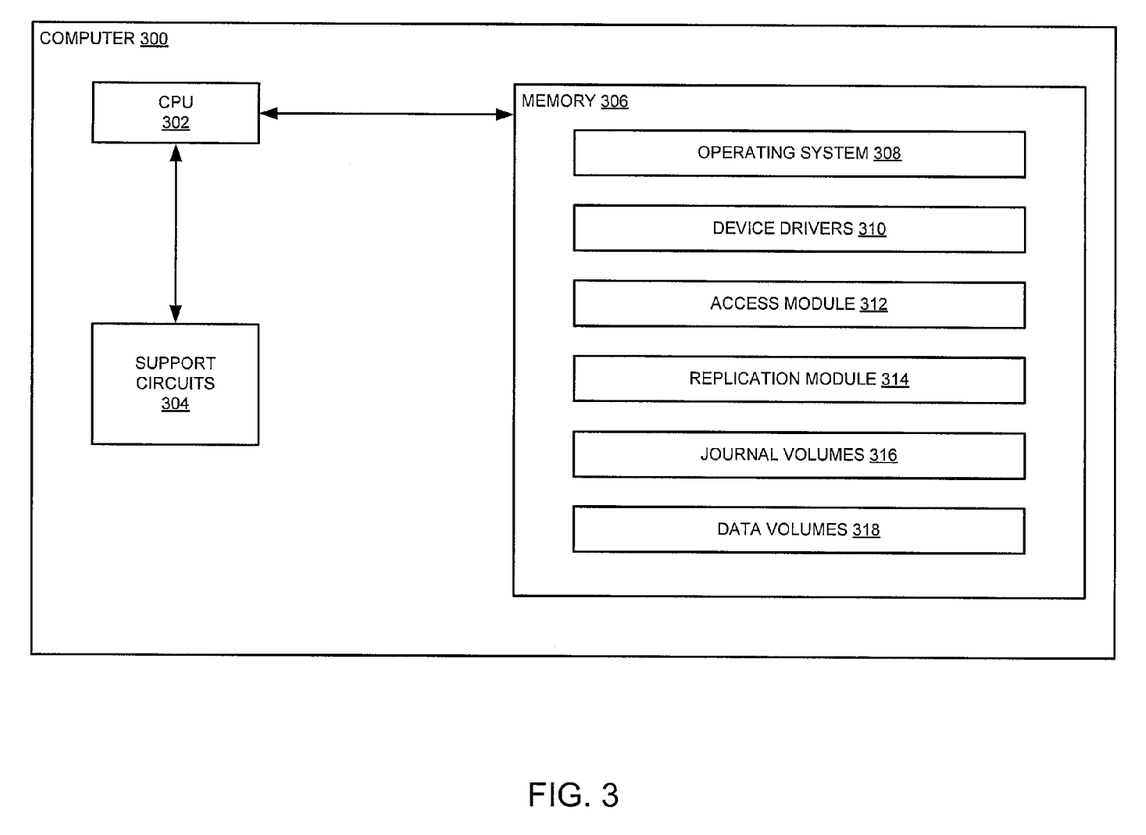
FIG. 3 is a block diagram of a computer securing data volume to a remote computer using journal volumes according to various embodiments.

FIG. 3 is a block diagram of a computer 300 for securing data volumes to a remote computer according to one or more embodiments. The computer 300 is a type of computing device (e.g., a laptop, a desktop and/or the like) that comprises a Central Processing Unit (CPU) 302, various support circuits 304 and a memory 306. The CPU 402 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a Read Only Memory, Random Access Memory, disk drive storage, optical storage, removable storage, and the like. The memory 306 includes an operating system 308 and device drivers 310 as well as various software packages and data, such as a creation module 312, an access module 314, one or more journal volumes 316 and one or more data volumes 318.

The operating system 308 generally manages various computer resources (e.g., network resources, data storage resources, file system resources and/or the like). The operating system 308 is configured to execute operations on one or more hardware and/or software components, such as Network Interface Cards (NICs), hard disks, virtualization layers, firewalls and/or the like. The operating system 308 may call one or more functions associated with the device drivers 310 to execute various file system and/or storage operations. As an example, the operating system 308 may utilize a device driver associated with a NIC card to communicate data to another computer as explained further below. The various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions to execute various file system and/or storage operations.

In some embodiments, the access module 312 includes software code (e.g., processor executable instructions) for accessing the one or more journal volumes 316 and one or more data volumes 318. In some embodiments, the access module 316 may create the one or more journal volumes 316 by logging a plurality of file system operations to the one or more data volumes 318 into one or more circular buffers.

Figure 4:
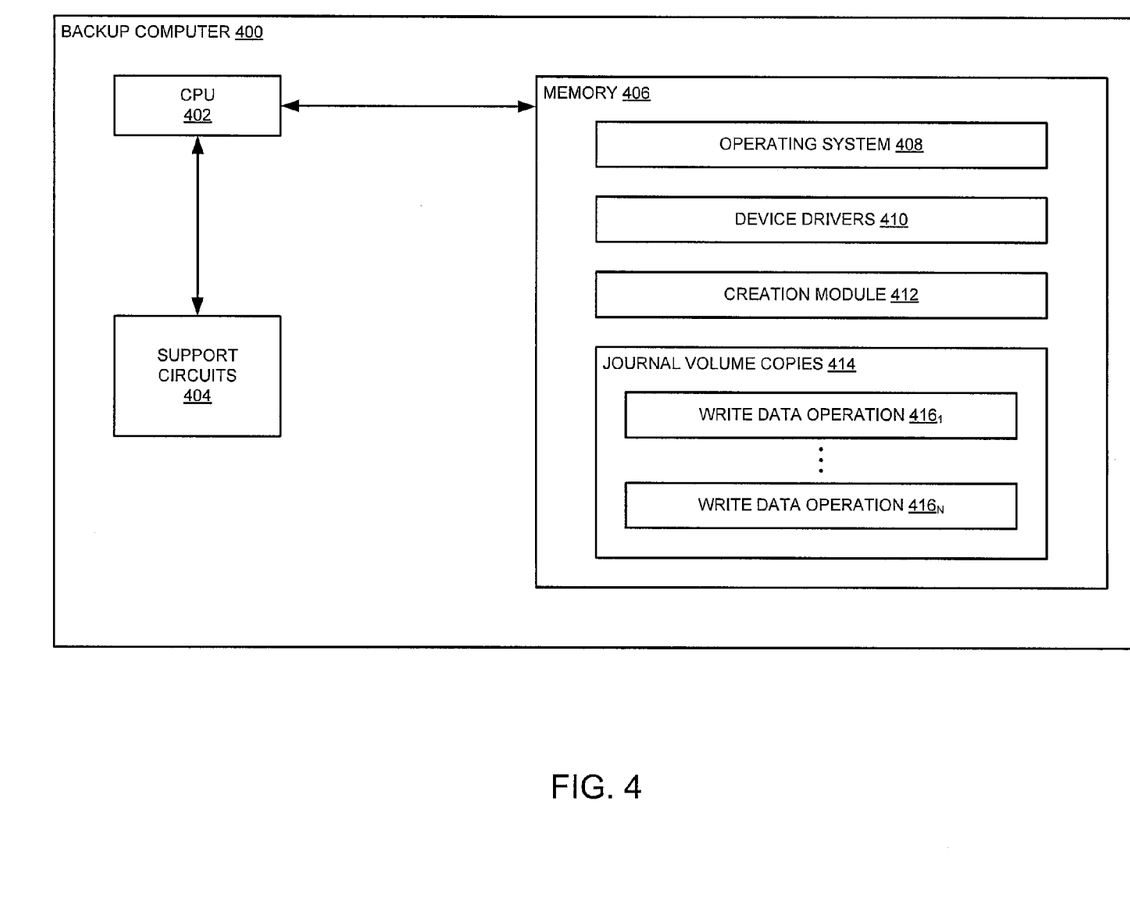
FIG. 4 is a block diagram of a backup computer securing data volume to a remote computer using journal volumes according to various embodiments.

In some embodiments, the replication module 314 includes software code (e.g., processor executable instructions) for synchronously replicating the one or more journal volumes 316 onto a backup system (e.g., the backup computer 104 of FIG. 4). The replication module 314 may be stored in the memory 306 and executed by the CPU 302 in order to produce and update one or more copies of the journal volumes 316 after each operation according to one or more embodiments. The replication module 314, for example, may store information associated with the plurality of file system operations onto the backup system as one or more circular buffers.

In some embodiments, the replication module 314 may create and manage one or more volume plexes associated with the journal volumes 316. Volume plexes, generally, represent complete copies of a particular volume, which may be maintained at two or more sites, such as a primary system and a backup system, simultaneously. The replication module 314 may initially record a plurality of write data operations into these volume plexes. The replication module 314 may then update these volume plexes after each subsequent write data operation with various information, such as location information, as well as one or more data blocks. A creation module (e.g., the creation module 116 of FIG. 1) may update one or more data volume copies at a remote computer using the location information. In addition, the creation module may execute the plurality of write data operations.

In some embodiments, the replication module 314 may synchronously replicate the journal volumes 316 to the one o more plexes at the backup computer (e.g., the backup computer 104 of FIG. 1) and the creation module may asynchronous replicate the plurality of write data operations to the one or more data volumes in parallel. The replication module may communicate with the creation module by acknowledging and executing commands issued by the backup computer. For example, the creation module may instruct the computer 300 to pause the replication of the journal volumes 316 to enable creating and updating one or more data volume copies at the remote computer. As such, the replication module 314 stops writing to the plexes at the backup computer and resumes replication in response to start writing command from the creation module. The replication module 314 cooperates with the creation module to permit read/write access to the one or more plexes.

In some embodiments, a copy of the data volumes 318 is not maintained at the backup computer. In other words, the replication module 314 does not replicate the data volumes 318 to a backup computer (e.g., bunker node). Copies of the data volumes 318 are instead maintained at a remote computer system to avoid damage and facilitate data volume recovery. By replicating the journal volumes 316 to the backup computer, the computer 102 is relieved of various replication tasks associated with the data volumes 318. The backup computer assumes these replications tasks and periodically updates the data volume copies at the remote computer. For example, the backup computer may execute the plurality of write data operation onto these data volume copies.

FIG. 4 is a block diagram of a backup computer 400 for securing data volumes to a remote computer according to one or more embodiments. The backup computer 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a Read Only Memory, Random Access Memory, disk drive storage, optical storage, removable storage, and the like. The memory 406 includes an operating system 408 and device drivers 410 as well as various software packages and data, such as a creation module 412, one or more journal volume copies 414.

In some embodiments, the one or more journal volume copies 414 may include information associated with one or more write data operations 416. For example, each write data operation 416 may include one or more data blocks as well as location information for storing the one or more data blocks. In some embodiments, the location information may define a volume identifier (e.g., a LUN address) of particular data volume within a plurality of data volumes (e.g., the data volumes 318 of FIG. 3). In some embodiments, the location information may further indicate an extent within the particular data volume to which a replication module (e.g., the replication module 314 of FIG. 3) writes the one or more data blocks.

The operating system 408 generally manages various computer resources (e.g., network resources, data storage resources, file system resources and/or the like). The operating system 408 is configured to execute operations on one or more hardware and/or software components, such as Network Interface Cards (NICs), hard disks, virtualization layers, firewalls and/or the like. The operating system 408 may call one or more functions associated with the device drivers 410 to execute various file system and/or storage operations. As an example, the operating system 408 may utilize a device driver associated with a NIC card to communicate data to another computer as explained further below. The various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions to execute various file system and/or storage operations.

In some embodiments, the creation module 412 includes software code (e.g., processor executable instructions) for creating one or more copies of the one or more data volumes at a remote computer using the journal volume copies 414 (e.g., the backup computer 104 of FIG. 1). The creation module 412 may be stored in the memory 406 and executed by the CPU 402 in order to asynchronously replicate the one or more data volumes by executing the plurality of write data operations 416 according to some embodiments. In some embodiments, the creation module 412 maintains a write order fidelity by executing the plurality of write data operation 416 in order of occurrence. The creation module 412, for example, may periodically update the one or more data volumes at the remote computer by executing one or more recent write data operations that occurred after a pre-determined time period in an exact order in which these operations were applied at a primary computer system (e.g., the computer 300 of FIG. 3 and/or the computer 102 of FIG. 1).

In some embodiments, the creation module 412 cooperates with a replication module (e.g., the replication module 314 of FIG. 3) at the primary computer system in order to perform the replication of one or more journal volumes and the creation of the one or more data volume copies in parallel while permitting simultaneous read/write access to the journal volume copies. The creation module 412 may instruct the replication module to pause the replication of the journal volumes. Then, the creation module 412 examines metadata associated with a plurality of write data operations by reading header information (e.g., a SRL header) within the journal volume copies 414.

After the creation module 412 asynchronously replicates one or more data volumes (e.g., the data volumes 318 of FIG. 3) to the remote computer using the journal volume copies 414, the creation module updates the header information to indicate a most recent write data operation. The journal volume copies 414, at this moment, reflect the replication of the plurality of write data operations. Accordingly, the creation module 412 and the replication module transform the data volumes and the journal volume copies 414 into the data volume copies at the remote computer.

In some embodiments, the creation module 412 coordinates access to one or more volume plexes associated with the one or more journal volumes (e.g., the journal volumes 316 of FIG. 3). As explained in the present disclosure, the volume plexes may be mirrored copies of the journal volumes, such as SRL (Storage Replicator Log) volumes. To enable such coordination, the creation module instructs the replication module to stop writing to the header information associated with the one or more plexes and then, updates the data volume copies at the remote computer. The creation module 412 may subsequently instruct the replication module to start writing to the header information after a pre-determined time period.

Figure 5:
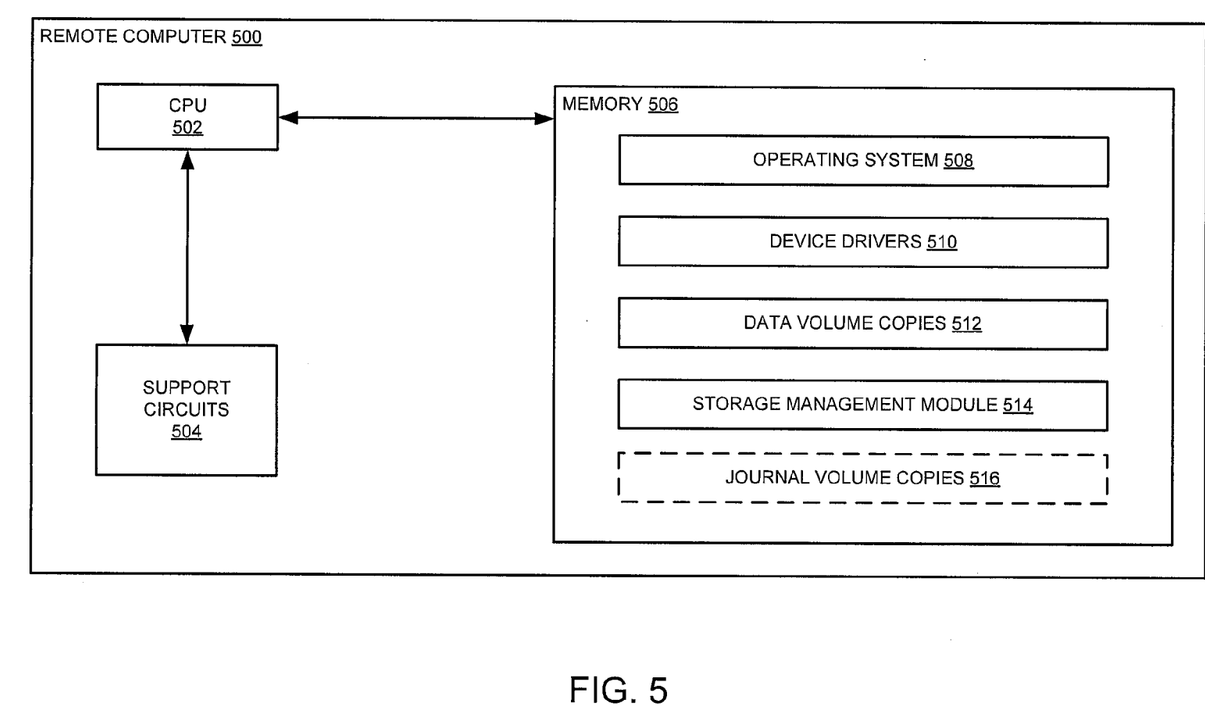
FIG. 5 is a block diagram of a recovery computer for securing data volume to a remote computer using journal volumes according to various embodiments.

FIG. 5 is a block diagram of a recovery computer 500 for securing data volumes to a remote computer according to one or more embodiments. The backup computer 500 is a type of computing device (e.g., a laptop, a desktop and/or the like) that comprises a Central Processing Unit (CPU) 502, various support circuits 504 and a memory 506. The CPU 502 may comprise one or more commercially available microprocessors or microcontrollers that facilitate data processing and storage. Various support circuits 504 facilitate operation of the CPU 502 and may include clock circuits, buses, power supplies, input/output circuits and/or the like. The memory 506 includes a Read Only Memory, Random Access Memory, disk drive storage, optical storage, removable storage, and the like. The memory 506 includes an operating system 508 and device drivers 510 as well as various software packages and data, such as one or more data volume copies 512 and storage management module 514.

The operating system 508 generally manages various computer resources (e.g., network resources, data storage resources, file system resources and/or the like). The operating system 508 is configured to execute operations on one or more hardware and/or software components, such as Network Interface Cards (NICs), hard disks, virtualization layers, firewalls and/or the like. The operating system 508 may call one or more functions associated with the device drivers 510 to execute various file system and/or storage operations. As an example, the operating system 508 may utilize a device driver associated with a NIC card to communicate data to another computer as explained further below. The various software packages call commands associated with the operating system 508 (i.e., native operating system commands) to perform various file system and/or storage operations, such as creating files or metadata, writing data to the files, reading data from the files, modifying metadata associated with the files and/or the like. The operating system 508 may call one or more functions to execute various file system and/or storage operations.

In some embodiments, the storage management module 514 includes software code (e.g., processor executable instructions) for performing a plurality of storage operations in order to create the data volume copies 512 of one or more data volumes (e.g., the data volumes 318 of FIG. 3) by asynchronous replication. The storage management module 514 cooperates with a creation module (e.g., the creation module 412 of FIG. 4) to periodically replicate one or more write data operations in order to update the one or more data volume copies according to various embodiments. In some embodiments, the creation module periodically communicates one or more write data operations of which the storage management module 514 executes such that the one or more data volume copies are kept in sync with the one or more data volumes at a primary computer system (e.g., the computer 102 of FIG. 1 and/or the computer 300 of FIG. 3).

Optionally, the memory 506 includes one or more journal volume copies 516 (e.g., the journal volume copies 414 of FIG. 4). The creation module may replicate one or more journal volumes to the recovery computer 500 before creating the data volume copies 512. According to some optional embodiments, the creation module communicates the one or more write data operations to the storage management module 514, which stores these write data operations in the journal volume copies 516. The storage management module 514 may then execute these write data operations on the data volume copies 512.

Figure 6:
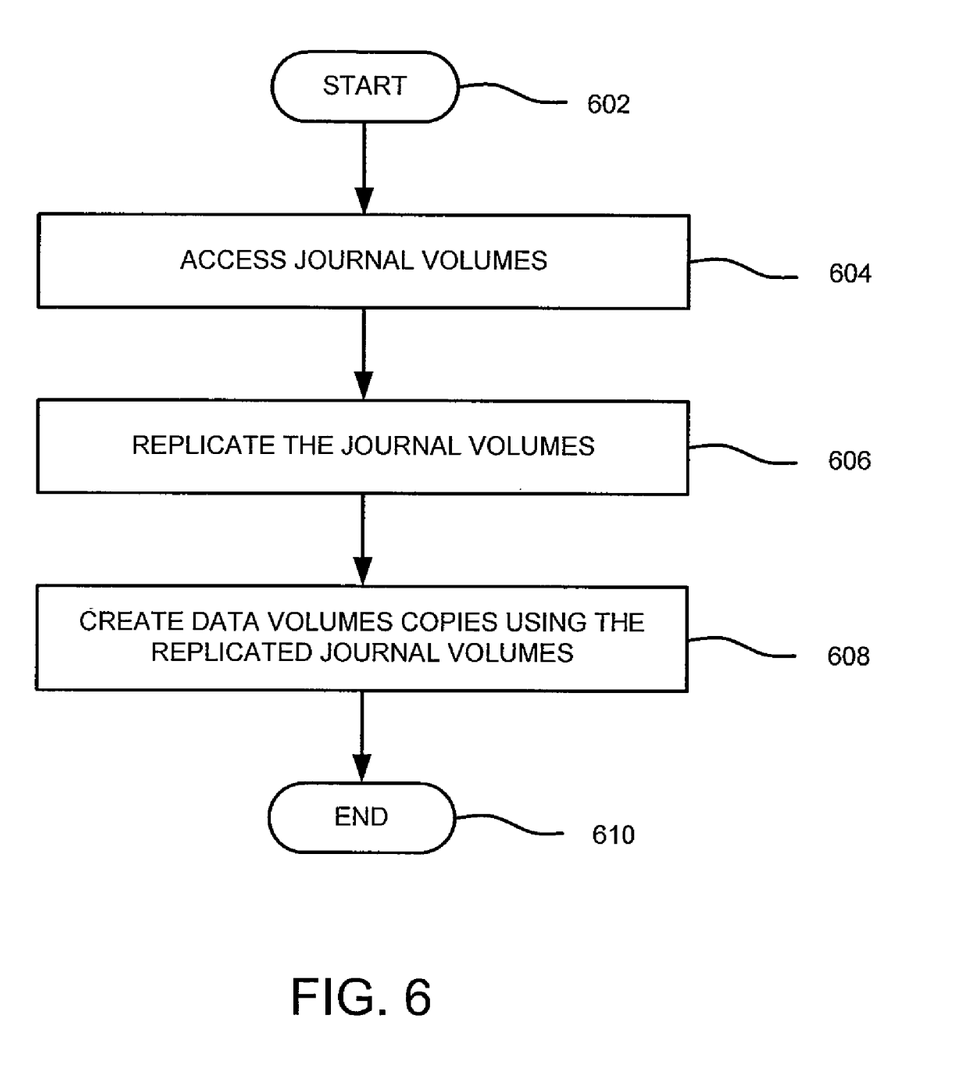
FIG. 6 is a flow diagram of a method for securing data volume to a remote computer using journal volumes according to various embodiments.

FIG. 6 is a method 600 for securing data volumes at a remote computer according to one or more embodiments. In some embodiments, the method 600 starts at step 602 and proceeds to step 604. In some embodiments, a replication module (e.g., the replication module 314 of FIG. 3) may cooperate with a creation module (e.g., the creation module 412 of FIG. 4) to transform one or more data volumes (e.g., the data volumes 110 of FIG. 1 and/or the data volumes 318 of FIG. 3) at a primary computer system and one or more journal volumes (e.g., the journal volumes 316 of FIG. 3) at a backup computer system into one or more data volume copies (e.g., the data volume copies 512 of FIG. 5) at a remote computer system.

At step 604, the one or more journal volumes and the one or more data volumes are accessed. The one or more journal volumes may indicate a plurality of file system operations associated with one or more data volumes. In some embodiments, one or more processors may execute an access module stored in memory in order to examine the one or more journal volumes and identify one or more write data operations. These write data operations may be scheduled for execution on one or more data volumes. As one or more data blocks are being written to the data volumes, the one or more write data operations are replicated as explained further below.

At step 606, the one or more journal volumes are replicated onto a backup computer after each operation of the plurality of the operations. In some embodiments, the one or more processors may execute the replication module stored in the memory in order to update one or more journal volume copies at the backup computer. The replication module may store information associated with one or more file system operations in the one or more copies of the journal volumes (e.g., volume plexes). The replication module, for example, may record location information (e.g., a LUN Identifier, an IP address, a volume group, an extent and/or the like) as well as one or more data blocks associated with each file system operation. In addition, the replication module updates metadata within the journal volume copies (e.g., header information for SRL volumes) during the asynchronous replication of the one or more data volumes to a remote computer as explained further below.

At step 608, the one or more data volume copies are created using the one or more replicated journal volumes at the backup computer. In some embodiments, the one or more processors may recall instructions stored in the memory and execute the creation module in order to asynchronously replicate the one or more data volumes after a pre-determined time period elapses. Accordingly, the data volumes are not replicated to the backup computer. The creation module updates the data volume copies at the remote computer using the information associated with the plurality of write data operations within one or more journal volume copies at the backup computer. In some embodiments, the creation module executes the plurality of write data operations onto the data volume copies. In some embodiments, the creation module instructs the replication module to pause the journal volume replication in order to update the data volume copies by asynchronously replicating the plurality of write data operations. After the plurality of write data operations are played, the creation module updates metadata (e.g., header information) within the journal volume copies and issues a command to resume the journal volume replication. At step 610, the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for securing data volumes in memory to a remote computer using at least one processor, comprising:
   accessing at least one data volume and at least one journal volume stored at a primary computer, wherein
      the at least one journal volume comprises a plurality of file system operations;
   synchronously replicating the at least one journal volume to a backup computer, wherein
      the at least one journal volume is replicated after each operation of a plurality of file system operations associated with the at least one data volume, and
      the replicating produces at least one replicated journal volume on the backup computer;
   asynchronously creating at least one data volume copy at the remote computer using the at least one replicated journal volume;
   detecting that a predetermined time period has expired; and
   pausing the replicating to perform the creating, in response to the detecting,
      wherein the pausing comprises the backup computer instructing the primary computer to stop writing to the backup computer.

2. The method of claim 1, wherein the asynchronously creating the at least one data volume copy at the remote computer is performed on a periodic basis.

3. The method of claim 1, wherein
   the creating the at least one data volume copy further comprises executing the plurality of file system operations onto the at least one data volume copy.

4. The method of claim 1, further comprising:
   periodically replicating the at least one replicated journal volume onto the remote computer.

5. The method of claim 1, wherein the synchronously replicating the at least one journal volume to the backup computer and the asynchronously creating the at least one data volume copy at the remote computer are performed in parallel.

6. The method of claim 1, further comprising: performing the replicating and the creating while permitting simultaneous read/write access to at least one journal volume copy at the backup computer.

7. The method of claim 1, further comprising: coordinating access to at least one volume plex associated with the at least one journal volume.

8. The method of claim 1, further comprising: transforming the at least one data volume and at least one journal volume into the at least one data volume copy at the remote computer.

9. A computer-readable-storage medium storing one or more processor-executable instructions that, when executed by at least one processor, causes the at least one processor to:
   store, in at least one journal volume, information associated with a plurality of file system operations, wherein the plurality of file system operations are associated with at least one data volume, and
   the at least one data volume and the at least one journal volume are stored at a primary computer;
   synchronously replicate the at least one journal volume to a backup computer after each operation of the plurality of file system operations associated with the at least one data volume to generate a replicated journal volume;
   asynchronously create at least one data volume copy at a remote computer using the at least one journal volume copy
   detect that a predetermined time period has expired; and
   pause replication of the at least one journal volume to create the at least one data volume copy, in response to the detecting, wherein
      pausing replication comprises the backup computer instructing the primary computer to stop writing to the backup computer.

10. The computer-readable-storage medium of claim 9, further comprising one or more processor-executable instructions that, when executed by the at least one processor, causes the at least one processor to:
    coordinate access to at least one volume plex associated with the at least one journal volume.

11. The computer-readable-storage medium of claim 9, wherein the at least one journal volume is synchronously replicated to the backup computer and the at least one data volume copy is asynchronously created at the remote computer in parallel.

12. The computer-readable-storage medium of claim 9, further comprising one or more processor-executable instructions that, when executed by the at least one processor, causes the at least one processor to:
    play the plurality of file system operations onto the at least one data volume copy.

13. The computer-readable-storage medium of claim 9, further comprising one or more processor-executable instructions that, when executed by the at least one processor, causes the at least one processor to:
    transform the at least one data volume and the at least one replicated journal volume at the backup computer into the at least one data volume copy at the remote computer.

14. The computer-readable-storage medium of claim 9, further comprising one or more processor-executable instructions that, when executed by the at least one processor, causes the at least one processor to:
    replicate the at least one journal volume and create the at least one data volume copy while permitting simultaneous read/write access to the at least one journal volume copy at the backup computer.

15. A system for securing data volumes to a remote computer comprising: one or more processors, and memory storing instructions executable on the one or more processors to:
    access at least one data volume and at least one journal volume stored at a primary computer, wherein
       the at least one journal volume comprises a plurality of file system operations;
    synchronously replicate the at least one journal volume to a backup computer, wherein
       the at least one journal volume is replicated after each operation of a plurality of file system operations associated with the at least one data volume, and
       the synchronous replication of the at least one journal volume produces at least one replicated journal volume;
    asynchronously create at least one data volume copy at the remote computer using the at least one replicated journal volume;
    detect that a predetermined time period has expired; and pause replication of the at least one journal volume to create the at least one data volume copy, in response to the detecting, wherein pausing replication comprises the backup computer instructing the primary computer to stop writing to the backup computer.

16. The system of claim 15, further comprising one or more instructions to:

perform the synchronous replication of the at least one journal volume and asynchronous creation of the at least one data volume copy while permitting simultaneous read/write access to the at least one replicated journal volume at the backup computer.

17. The system of claim 15, further comprising one or more instructions to:

coordinate access to at least one volume plex associated with the at least one journal volume.

18. The system of claim 15, further comprising one or more instructions to:

update the at least one replicated journal volume after each write data operation of at least one write data operation and create the at least one data volume copy in parallel.

* * * * *